US010403034B2

(12) United States Patent
Ha et al.

(10) Patent No.: US 10,403,034 B2
(45) Date of Patent: Sep. 3, 2019

(54) IMAGE PROCESSING METHOD AND APPARATUS FOR RENDERING AN IMAGE BASED ON VIRTUAL POINT LIGHT (VPL) SAMPLINGS

(71) Applicant: Samsung Electronics Co., Ltd., Suwon-si (KR)

(72) Inventors: Inwoo Ha, Yongin-si (KR); Minsu Ahn, Seoul (KR); Seungin Park, Yongin-si (KR); Hyong Euk Lee, Suwon-si (KR)

(73) Assignee: Samsung ELectronics Co., Ltd., Suwon-si (KR)

( * ) Notice: Subject to any disclaimer, the term of this patent is extended or adjusted under 35 U.S.C. 154(b) by 237 days.

(21) Appl. No.: 14/707,761

(22) Filed: May 8, 2015

(65) Prior Publication Data

US 2015/0325041 A1 Nov. 12, 2015

(30) Foreign Application Priority Data

May 9, 2014 (KR) .................. 10-2014-0055875
Dec. 23, 2014 (KR) .................. 10-2014-0187465

(51) Int. Cl.
*G06T 15/50* (2011.01)
*G06T 19/00* (2011.01)
*G06T 5/30* (2006.01)

(52) U.S. Cl.
CPC ............ *G06T 15/506* (2013.01); *G06T 5/30* (2013.01); *G06T 15/50* (2013.01); *G06T 19/006* (2013.01); *G06T 2207/10004* (2013.01); *G06T 2207/10024* (2013.01)

(58) Field of Classification Search
None
See application file for complete search history.

(56) References Cited

U.S. PATENT DOCUMENTS

| | | | |
|---|---|---|---|
| 2010/0232499 A1* | 9/2010 | Reme | H04N 19/172 |
| | | | 375/240.12 |
| 2011/0012901 A1 | 1/2011 | Kaplanyan | |
| 2011/0304745 A1 | 12/2011 | Wang et al. | |

FOREIGN PATENT DOCUMENTS

| | | |
|---|---|---|
| CN | 103606182 A | 2/2014 |
| JP | 8-287295 A | 11/1996 |
| JP | 2013-117966 A | 6/2013 |
| JP | 2013-117992 A | 6/2013 |
| JP | 2014-38426 A | 2/2014 |
| KR | 10-1088373 B1 | 12/2011 |
| KR | 10-2012-0004227 A | 1/2012 |

(Continued)

OTHER PUBLICATIONS

Georgiev, I., Slusallek, P., Simple and Robust Iterative Importance Sampling of Virtual Point Lights, May 2010, Eurogrpahics 2010, pp. 1-4.*

(Continued)

*Primary Examiner* — Said Broome
(74) *Attorney, Agent, or Firm* — NSIP Law

(57) ABSTRACT

An image processing method includes determining a number of virtual point light (VPL) samplings for each area of a current frame, applying VPLs sampled in a previous frame to the current frame, adjusting a result of the applying based on the determined number of VPL samplings, and rendering the current frame based on VPLs sampled in the current frame.

32 Claims, 12 Drawing Sheets

(56) References Cited

FOREIGN PATENT DOCUMENTS

| KR | 10-2012-0062542 A | 6/2012 |
|---|---|---|
| KR | 10-2013-0003376 A | 1/2013 |
| KR | 10-2015-0009906 A | 1/2015 |

OTHER PUBLICATIONS

Keller, A., Instant Radiosity, Aug. 1997, SIGGRAPH '97, Proceedings of the 24th annual conference on Computer Graphics and interactive techniques, pp. 49-56.*

Laine, S., Saransaari, H., Kontkanen, J., Lehtinen, J., Aila, T., Incremental Instant Radiosity for Real-Time Indirect Illumination, Jun. 2007, Eurographics Symposium on Rendering 2007, pp. 277-286.*

Ou, J., Pellacini, F., LightSlice: matrix slice sampling for the many-lights problem, Dec. 2011, Proceedings of the 2011 SIGGRAPH Asia Conference, vol. 30, pp. 1-10.*

Knecht, M., Traxler, C., Mattausch, O., Purgathofer, W., Wimmer, M., Differential Instant Radiosity for Mixed Reality, Oct. 2010, IEEE International Symposium on Mixed and Augmented Reality 2010, pp. 99-107.*

Laine, Samuli, et al. "Incremental instant radiosity for real-time indirect illumination." Proceedings of the 18th Eurographics conference on Rendering Techniques. Eurographics Association, 2007. (10 page, in English).

Knecht, Martin, et al. "Differential instant radiosity for mixed reality." Mixed and Augmented Reality (ISMAR), 2010 9th IEEE International Symposium on. IEEE, 2010. (9 pages in English).

Extended European Search Report dated Nov. 9, 2015, in counterpart European Application No. 15166965.2 (9 pages in English).

A. Keller, "Instant Radiosity," *Proceeding of the 24th Annual Conference on Computer Graphics and Interactive Techniques (SIGGRAPH 1997)*, 1997, pp. 46-56, conference held at Los Angeles, California, on Aug. 3-8, 1997.

R. Ramamoorthi et al., "Frequency Space Environment Map Rendering," *Proceedings of the 29th Annual Conference on Computer Graphics and Interactive Techniques (SIGGRAPH 2002)*, 2002, pp. 517-526, conference held at San Antonio, Texas, on Jul. 21-26, 2002, paper presented on Jul. 25, 2002.

P. Clarbeg et al., "Wavelet Importance Sampling: Efficiently Evaluating Products of Complex Functions," *Proceedings of the 32nd International Conference on Computer Graphics and Interactive Techniques (SIGGRAPH 2005)*, 2005, pp. 1166-1175, conference held at Los Angeles, California, on Jul. 31-Aug. 4, 2005, paper presented on Aug. 4, 2005.

C. Dachsbacher et al., "Splatting Indirect Illumination," *Proceedings of the 2006 Symposium on Interactive 3D Graphics and Games (I3D 2006)*, 2006, pp. 93-100, 226, conference held at Redwood City, California, on Mar. 14-17, 2006, paper presented on Mar. 16, 2006.

T. Ritschel et al., "Imperfect Shadow Maps for Efficient Computation of Indirect Illumination," *Proceedings of the 1st ACM SIGGRAPH Conference and Exhibition on Computer Graphics and Interactive Techniques in Asia (SIGGRAPH Asia 2008)*, 2008, Article No. 129, conference held at Singapore on Dec. 10-13, 2008, paper presented on Dec. 12, 2008 (8 pages).

T. Ritschel et al., "Making Imperfect Shadow Maps View-Adaptive: High-Quality Global Illumination in Large Dynamic Scenes," *Computer Graphics Forum*, vol. 30, No. 8, Dec. 2011, pp. 2258-2269, first published online Nov. 3, 2011.

T. Barák et al., "Temporally Coherent Adaptive Sampling for Imperfect Shadow Maps," *Proceedings of the 24th Eurographics Symposium on Rendering (EGSR 2013)*, vol. 32, No. 4, 2013, pp. 87-96, conference held at Zaragoza, Spain, on Jun. 19-21, 2013, paper presented on Jun. 20, 2013.

Nishikawa, Z, "Revised Edition of 3D Graphics Technology to Become a Game Producer", Impress Japan Co., Ltd., Feb. 2013. pp. 323-335. (1 page in English, 15 pages in Japanese).

Chinese Office Action dated Oct. 23, 2018 in corresponding Chinese Patent Application No. 201510187622.4 (17 pages in English, 12 pages in English).

Japanese Office Action dated Oct. 16, 2018 in corresponding Japanese Patent Application No. 2015-090585 (2 pages in English, 3 pages in Japanese).

* cited by examiner

IMAGE PROCESSING METHOD AND APPARATUS FOR RENDERING AN IMAGE BASED ON VIRTUAL POINT LIGHT (VPL) SAMPLINGS

CROSS-REFERENCE TO RELATED APPLICATIONS

This application claims the benefit under 35 USC 119(a) of Korean Patent Application Nos. 10-2014-0055875 filed on May 9, 2014, and 10-2014-0187465 filed on Dec. 23, 2014, in the Korean Intellectual Property Office, the entire contents of which are incorporated herein by reference for all purposes.

BACKGROUND

1. Field

This application relates to image processing technology for rendering an image.

2. Description of Related Art

In various fields including, for example, three-dimensional (3D) games, virtual reality (VR) and augmented reality (AR) animations, user interfaces (UI), and movies, an interest in real-time rendering of a 3D model is increasing. Among 3D rendering technologies, a radiosity method using global illumination is one method of rendering by applying not only direct illumination by a direct light source included in the 3D model, but also an effect of, for example, a diffused reflection or a reflected light generated by the direct illumination reflected by an object.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image processing method includes determining a number of virtual point light (VPL) samplings for each area of a current frame; applying VPLs sampled in a previous frame to the current frame; adjusting a result of the applying based on the determined number of VPL samplings; and rendering the current frame based on the adjusted result of the applying.

The adjusting may include adjusting a number of VPLs sampled in each area of the current frame to which the VPLs of the previous frame are applied based on the determined number of VPL samplings for each area of the current frame.

The adjusting may include sampling at least one new VPL in addition to the VPLs applied to the current frame to satisfy the determined number of VPL samplings.

The sampling may include determining a position at which the new VPL is to be sampled based on a luminance distribution of an area in which the new VPL is to be sampled.

The sampling may include randomly determining a position at which the new VPL is to be sampled in an area in which the new VPL is to be sampled.

The sampling may include determining a position at which the new VPL is to be sampled based on either one or both of a movement of an object included in the current frame and material characteristics of the object.

The sampling may include sampling the new VPL at a center position of each subarea in an area in which the new VPL is to be sampled.

The adjusting may include removing at least one VPL from the VPLs applied to the current frame to satisfy the determined number of VPL samplings.

The removing may include determining a VPL to be removed from the VPLs applied to the current frame based on a luminance of the VPLs applied to the current frame.

The determining may include setting a plurality of object areas in the current frame; and determining the number of VPL samplings for each of the set object areas.

The determining may include setting a plurality of grid areas in the current frame; and determining the number of VPL samplings for each of the set grid areas.

The applying may include sampling a VPL at a position in the current frame corresponding to a position at which each of the VPLs is sampled in the previous frame.

The applying may include applying the VPLs sampled in the previous frame to the current frame using any one or any combination of any two or more of a view matrix, a projection matrix, and a model matrix.

The adjusting may include adjusting a luminance of the VPLs sampled in the current frame based on a luminance of the VPLs sampled in the previous frame.

The method may further include performing spatial filtering on the current frame; and the determining may include determining the number of VPL samplings for each area of the current frame on which the spatial filtering is performed.

The determining may include determining the number of VPL samplings for each of a plurality of grid areas of the current frame; and the adjusting may include adjusting a number of VPLs sampled in each grid area of the current frame based on the determined number of VPL samplings for each grid area of the current frame.

The determining may include determining the number of VPL samplings for each grid area based on luminance information on each grid area.

The adjusting may include adjusting a number of VPLs to be sampled in each grid area of the current frame to which the VPLs of the previous frame are applied based on the determined number of VPL samplings for each grid area of the current frame.

In another general aspect, a non-transitory computer-readable storage medium stores instructions for controlling a processor to perform the method described above.

In another general aspect, an image processing apparatus includes a virtual point light (VPL) density determiner configured to determine a number of VPL samplings for each area of a current frame; a VPL sampler configured to apply VPLs sampled in a previous frame to the current frame, and adjust a result of the applying based on the determined number of VPL samplings for each area of the current frame; and a renderer configured to render the current frame based on the adjusted result of the applying.

The apparatus may further include a temporal filter configured to adjust a luminance of the VPLs sampled in the current frame based on a luminance of the VPLs sampled in the previous frame.

The apparatus may further include a spatial filter configured to apply a spatial filter to the current frame; and the VPL density determiner may be further configured to determine a number of VPLs sampled in each area of the current frame to which the spatial filter is applied.

The VPL sampler may be further configured to adjust a number of VPLs sampled in each area of the current frame to which the VPLs of the previous frame are applied based on the determined number of VPL samplings for each area of the current frame.

The VPL density determiner may be further configured to set a plurality of grid areas in the current frame, and determine the number of VPL samplings for each of the set grid areas.

The VPL density determiner may be further configured to determine the number of VPL samplings for each grid area based on luminance information on each grid area.

In another general aspect, an image processing apparatus includes a virtual point light (VPL) density determiner configured to determine a number of VPL samplings for each grid area of a current frame; a VPL sampler configured to sample a VPL in each grid area based on the determined number of VPL samplings; and a renderer configured to render the current frame based on the VPL sampled in each grid area of the current frame.

In another general aspect, an image processing method includes determining a number of virtual light points (VPLs) for each area of a current frame; sampling VPLs in the current frame based on VPLs sampled in a previous frame and the determined number of VPLs for each area; and rendering the current frame based on the VPLs sampled in the current frame.

The determining may include determining the number of VPLs for each area of the current frame based on information on the current frame.

The sampling may include applying the VPLs sampled in the previous frame to the current frame; and keeping as many of the VPLs applied from the previous frame as possible in the current frame without exceeding the number of VPLs determined for each area of the current frame.

The sampling further may include sampling new VPLs in the current frame based on a number of the VPLs applied from the previous frame kept in the current frame so that each area of the current frame may include only the number of VPLs determined for the area.

The sampling may include applying the VPLs sampled in the previous frame to the current frame; in any area of the current frame in which a number of the VPLs applied from the previous frame exceeds the number of VPLs determined for the area, removing from the area enough of the VPLs applied from the previous frame to cause the area to include only the number of VPLs determined for the area; and in any area of the current frame in which a number of the VPLs applied from the previous frame is less than the number of VPLs determined for the area, sampling enough new VPLs in the area to cause the area to include only the number of VPLs determined for the area.

The sampling may be performed in a way that reduces flickering between the previous frame and the current frame in the rendered current frame.

Other features and aspects will be apparent from the following detailed description, the drawings, and the claims.

DETAILED DESCRIPTION

Figure 1:
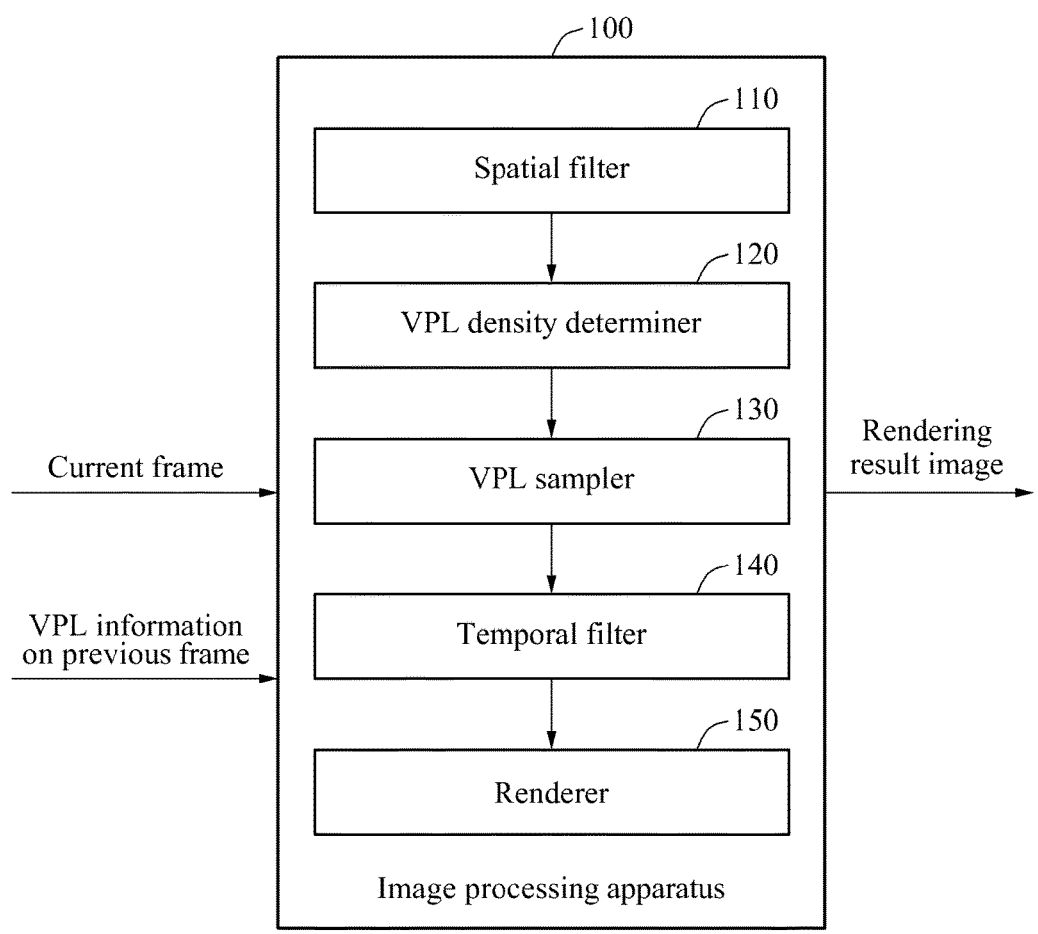
FIG. 1 illustrates an example of an image processing apparatus.

The following detailed description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The terminology used herein is for the purpose of describing particular examples only, and is not intended to limit the scope of the disclosure in any way, As used herein, the singular forms "a," "an," and "the," are intended to include the plural forms as well, unless the context clearly indicates otherwise. It will be further understood that the terms "comprises," "comprising," "includes," and "including," when used herein, specify the presence of stated features, numbers, operations, elements, components, or combinations thereof, but do not preclude the presence or addition of one or more other features, numbers, operations, elements, components, or combinations thereof.

It should also be noted that in some alternative implementations, the functions and operations described may occur out of the order illustrated in the figures. For example, two figures shown in succession may in fact be executed substantially concurrently or may sometimes be executed in the reverse order, depending upon the functions and operations involved.

FIG. 1 illustrates an example of an image processing apparatus 100.

The image processing apparatus 100 renders two-dimensional (2D) graphics or three-dimensional (3D) graphics. The image processing apparatus 100 renders an image space expressed using an image frame, and outputs a rendering result image. The image processing apparatus 100 may perform a 3D rendering in a field such as a game, a movie, a user interface, virtual reality, or augmented reality.

The image processing apparatus 100 arranges a virtual point light (VPL) for expressing a natural phenomenon such as light reflection, refraction, and diffraction in an image space of a current frame to realize a global illumination effect in graphic rendering. In contrast to a direct light source from which a light is directly emitted to the image space, the VPL is a virtual light source for considering a phenomenon that the light emitted from the direct light source is reflected, refracted, or diffracted. The VPL may also referred to as, for example, an indirect light source. A sampling of the VPL may be, for example, an operation of determining an area in which the VPL is to be arranged in the image space represented by the image frame. The image processing apparatus applies an indirect light effect to the image space based on an area in which the VPL is arranged as a center.

Based on the area in which the VPL is arranged in the image space, an illumination effect may be differently realized in the rendering result image.

The image processing apparatus 100 samples the VPL in the current frame based on a VPL sampling result of a previous frame. The current frame is an image frame on which a rendering is currently being performed, and is temporally concatenated with the previous frame. The previous frame may be, for example, an image frame provided earlier than the current frame, and may have a VPL sampled earlier than sampled VPL of the current frame.

The image processing apparatus 100 may apply VPLs sampled in the previous frame to the current frame based on VPL information on the previous frame, and then adjust a result of the applying based on a luminance distribution of the current frame. The VPL information on the previous frame may include, for example, information on a VPL sampled in a light view rendering image of the previous frame, and information on a ray collision position obtained based on a ray tracing scheme.

The image processing apparatus 100 samples the VPL of the current frame based on the VPL sampling result of the previous frame, thereby avoiding an occurrence of flickering and reducing resources. For example, the image processing apparatus 100 may sample the VPL in the current frame based on a shadow map for each VPL used in the previous frame. The image processing apparatus 100 may sample the VPLs based on the luminance distribution of the current frame, thereby outputting a rendering result image having a high resolution in consideration of a lighting environment of the current frame. Hereinafter, an operation of the image processing apparatus 100 will be explained.

Referring to FIG. 1, the image processing apparatus 100 includes a VPL density determiner 120, a VPL sampler 130, and a renderer 150.

The VPL density determiner 120 determines a number of VPL samplings used for each area of the current frame. In this application, the number of VPL samplings indicates the number of VPLs to be sampled in a predetermined area of the current frame. For example, the number of VPL samplings may indicate the number of VPLs to be sampled in a pixel area or a pixel group area. A plurality of VPLs may be sampled in a single pixel area, and the pixel group area may be, for example, a bounding box area, a grid area, or an object area included in the current frame.

The VPL density determiner 120 determines the number of VPL samplings used for each area of the current frame based on, for example, shape information on an object, a direction of the direct light source, a position of the direct light source, a viewpoint, and luminance information on the current frame. The VPL density determiner 120 may allocate a greater number of VPL samplings to an area having a relatively high luminance in the current frame. Alternatively, the VPL density determiner 120 may determine the number of VPL samplings based on normal information corresponding to the shape information on the object, that is, information about normals to the surface of the object. The VPL density determiner 120 may apply a weight to each of a luminance value and a normal value of the predetermined area in the current frame, obtain a sum of results of the applying, and then set a higher sampling probability that a VPL is to be sampled for an area corresponding to a relatively large sum. That is, the higher the sum for a predetermined area, the higher the probability that a VPL is to be sampled in the predetermined area, and the lower the sum for the predetermined area, the lower the probability that a VPL is to be sampled in the predetermined area.

Hereinafter, a probability that a VPL is to be sampled may also be referred to as a sampling probability. The VPL density determiner 120 may determine the number of VPL samplings for each area of the current frame based on the sampling probability set for each area of the current frame.

The VPL density determiner 120 may determine the number of VPL samplings based on the luminance distribution using, for example, an importance sampling scheme. In the importance sampling scheme, a higher sampling probability is set for an area having a relatively high luminance in the current frame compared to an area having a relatively low luminance.

The VPL sampler 130 samples the VPLs in the current frame. The VPL sampler 130 applies or projects the VPLs sampled in the previous frame to the current frame. The VPL sampler 130 adjusts the number of VPLs sampled in each area of the current frame to which the VPLs of the previous frame are applied based on the number of VPL samplings determined for each area of the current frame.

For example, the VPL sampler 130 may additionally sample a new VPL in the current frame to which the VPLs of the previous frame are applied. Alternatively, the VPL sampler 130 may maintain or remove the VPLs of the previous frame projected onto the current frame. The VPL sampler 130 may rearrange the VPLs in the current frame based on an importance of each of the VPLs applied from the previous frame to the current frame.

The VPL sampler 130 generates a VPL sampling result for the current frame by projecting the VPLs sampled in the previous frame onto the current frame. Also, the VPL sampler 130 may determine an entire VPL set for the current frame by additionally sampling a new VPL in consideration of a lighting environment. When a difference in the lighting environment between the previous frame and the current frame is relatively small, sampling of a new VPL that was not sampled in the previous frame may not be needed. In this example, an additional procedure of sampling the new VPL may omitted in the current frame.

By applying the VPL sampling result of the previous frame to the current frame, a positional change occurring in VPLs of temporally concatenated image frames may be minimized so that an occurrence of flickering may be reduced.

When the previous frame has the same luminance distribution as that of the current frame, the same number of VPL samplings may be determined for each area of the previous frame and the current frame. In this example, the VPLs may be sampled at the same position in the current frame and the previous frame. Conversely, when the luminance distribution of the previous frame differs from the luminance distribution of the current frame, a different number of VPL samplings may be determined for each area of the previous frame and the current frame. In this example, the VPLs of the previous frame applied to the current frame may be rearranged.

Information associated with the VPLs sampled in the current frame may be used in a VPL sampling process of a subsequent frame temporally concatenated with the current frame.

In another example, the image processing apparatus 100 in FIG. 1 includes either one or both of a spatial filter 110 and a temporal filter 140.

The spatial filter 110 performs spatial filtering on the current frame before sampling the VPLs in the current frame. When a position, a color, or a normal characteristic of a predetermined VPL radically changes between frames, flickering may occur. To reduce an influence of the flickering, the spatial filter 110 reduces a spatial discontinuity of the position, the color, or the normal characteristic of the predetermined VPL. As an example, the spatial filter 110 may apply a Gaussian kernel to the current frame and filter an area having a radical change in an object or an image space, thereby preventing a radical change in a VPL characteristic between frames. However, any other kernel capable of performing spatial filtering known to one of ordinary skill in the art may be used. The VPL density determiner 120 determines the number of VPL samplings for each area of the current frame.

The temporal filter 140 performs temporal filtering on the current frame after the VPL sampling is completed in the current frame. The temporal filter 140 may adjust a luminance of a VPL sampled in the current frame based on a luminance of a VPL of the previous frame to prevent a radical change in the luminance between the previous frame and the current frame.

The renderer 150 renders the current frame using the VPLs sampled in the current frame and outputs a rendering result image. For example, the renderer 150 arranges the sampled VPLs in an image space of the current frame, and outputs the rendering result image generated by applying an indirect light effect caused by the VPLs.

Hereinafter, another example of the image processing apparatus 100 sampling a VPL for each grid area of a current frame based on luminance information on the current frame in lieu of applying a VPL sampling result of a previous frame to the current frame will be described. In this example, the image processing apparatus 100 includes the VPL density determiner 120, the VPL sampler 130, and the renderer 150.

The VPL density determiner 120 determines the number of VPL samplings for each grid area of the current frame. The VPL density determiner 120 may determine the number of VPL samplings for each of grid areas based on a luminance distribution of the grid areas in the current frame. For example, the VPL density determiner 120 may determine the number of VPL samplings so that a greater number of VPLs are sampled in a grid area having a higher luminance. Also, the VPL density determiner 120 may determine an average luminance value for each of the grid areas, and may determine a predetermined number of VPL samplings corresponding to the average luminance value as the number of VPL samplings for each of the grid areas.

The VPL sampler 130 samples the VPLs in the grid areas of the current frame based on the number of VPL samplings determined for each of the grid areas. The renderer 150 renders the current frame based on the VPLs sampled in the current frame, and outputs a rendering result image. The image processing apparatus 100 may perform a grid area-based VPL sampling, thereby sampling the VPLs in the current frame at an increased rate.

Figure 2:
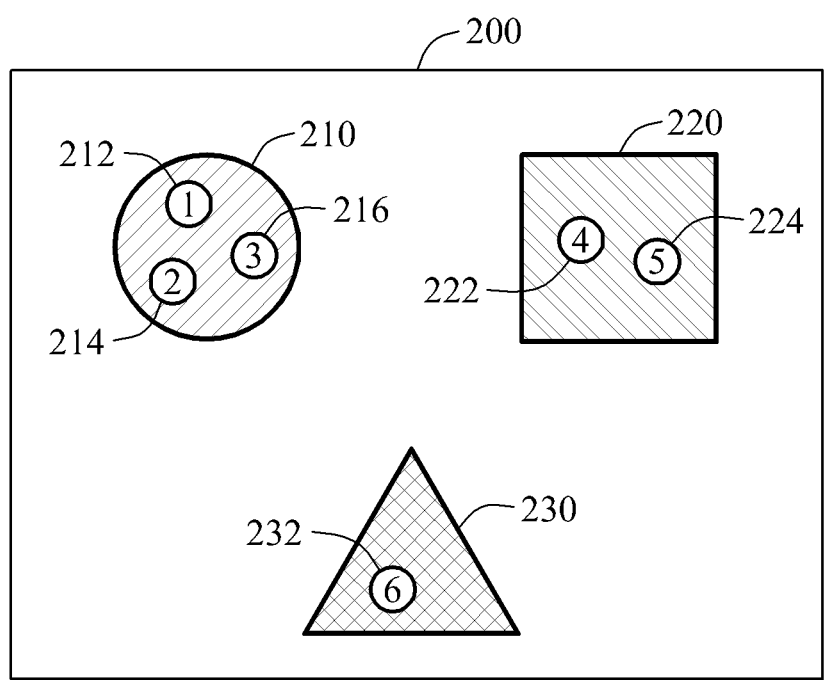
FIGS. 2 through 4 illustrate an example of sampling a virtual point light (VPL) in a current frame.
Figure 3:
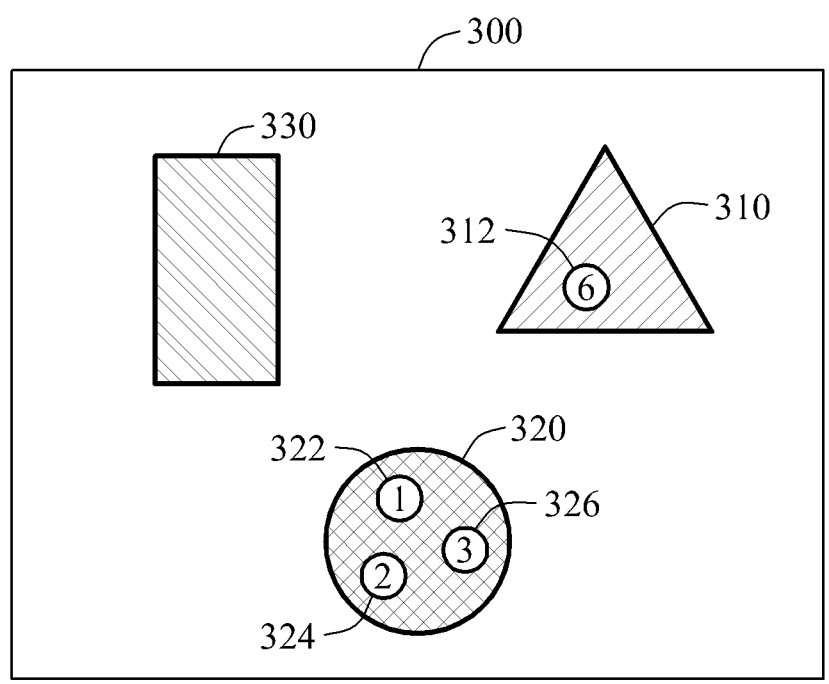
Figure 4:
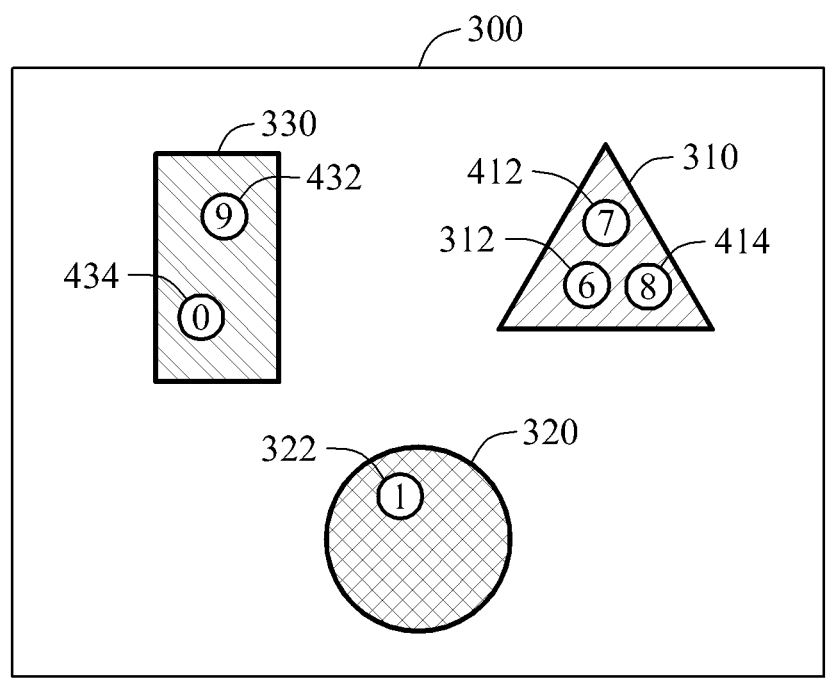

FIGS. 2 through 4 illustrate an example of sampling a VPL in a current frame.

Referring to FIG. 2, an example of a previous frame 200 includes three object areas, a first object area 210, a second object area 220, and a third object area 230. In the previous frame 200, VPLs 212, 214, and 216 are sampled in the first object area 210, VPLs 222 and 224 are sampled in the second object area 220, and a VPL 232 is sampled in the third object area 230.

Referring to FIG. 3, an example of a VPL sampling result of the previous frame 200 is applied to a current frame 300. The current frame 300 includes a first object area 320 and a third object area 310 respectively corresponding to the first object area 210 and the third object area 230 of the previous frame 200. An object area corresponding to the second object area 220 of the previous frame 200 is not included in the current frame 300, and a fourth object area 330 is newly included in the current frame 300.

The VPL sampler 130 samples VPLs at positions corresponding to positions at which the VPLs 212, 214, 216, 222, 224, and 232 are sampled in the previous frame 200. Since the VPL sampling result of the previous frame 200 is applied to the current frame 300, the VPLs 212, 214, and 216 sampled in the first object area 210 of the previous frame 200 are projected onto the first object area 320 of the current frame 300 as VPLs 322, 324, and 326. Also, the VPL 232 sampled in the third object area 230 of the previous frame 200 is projected onto the third object area 310 of the current frame 300 as a VPL 312. However, the current frame 300 does not include an object area corresponding to the second object area 220 of the previous frame, so the VPLs 222 and 224 sampled in the second object area 220 of the previous frame are not projected onto the current frame 300.

The VPL sampler 130 projects the VPLs 212, 214, 216, 222, 224, and 232 sampled in the previous frame 200 onto the current frame based on a conversion matrix such as any one or any combination of any two or more of a view matrix, a projection matrix, and a model matrix for each object. The VPL sampler 130 may project the VPLs 212, 214, 216, 222, 224, and 232 sampled in the previous frame 200, onto the current frame 300 based on, for example, VPL sampling information on the previous frame 200 and a result of multiplying a view matrix of the current frame 300 by an inverse matrix of a view matrix of the previous frame 200. Also, the VPL sampler 130 may apply the VPL sampling information of the previous frame 200 to the current frame 300 based on the model matrix for each object. In this example, the VPL sampling information of the previous frame 200 may be related to a dynamic object from which a movement is sensed.

The current frame 300 may differ from the previous frame 200 in terms of a viewpoint, a global or local luminance, or other factors. Also, in comparison to the previous frame 200, a new object may be added to the current frame 300, and an object in the previous frame 200 may change a position or disappear in the current frame 300. To minimize an influence of the aforementioned factors, the image processing apparatus adjusts the VPL sampling result of the current frame 300 to which the VPL sampling result of the previous frame 200 is applied. The VPL sampler 130 may sample a new VPL other than the VPLs of the previous frame 200 applied to the current frame 300 so that the number of VPL samplings determined for each of the object areas of the current frame 300 is satisfied.

FIG. 4 illustrates an example of a result of adjusting the VPL sampling result of the previous frame 200 applied to the current frame 300. The VPL density determiner 120 sets object areas, for example, the first object area 320, the third object area 310, and the fourth object area 330, for each object represented in the current frame 300. Also, the VPL density determiner 120 determines the number of VPL samplings for each of the object areas based on a luminance distribution of the object areas. The VPL density determiner 120 may determine the number of VPL samplings for each of the object areas in the current frame 300 so that, for example, a greater number of VPLs is sampled in an object area having a higher luminance. The VPL sampler 130 adjusts the number of VPLs sampled in each of the object areas in the current frame 300 to which the VPL sampling result of the previous frame 200 is applied so that the number of VPL samplings determined for each of the object areas is satisfied.

In the example in FIG. 4, the number of VPL samplings determined for the first object area 320 is "1", the number of VPL samplings determined for the third object area 310 is "3", and the number of VPL samplings determined for the fourth object area 330 is "2".

When the number of VPLs applied from the previous frame 200 to a predetermined area of the current frame is greater than the number of VPL samplings determined for the predetermined area, the VPL sampler 130 removes at least one VPL from the applied VPLs so that the number of VPL samplings determined for the predetermined area is satisfied. While one VPL is to be sampled in the first object area 320 of the current frame 300, three VPLs, i.e., the VPLs 322, 324, and 326 of the first object area 320, appear in the first object area 320 of the current frame 300 in the VPL sampling result applied from the previous frame 200 as illustrated in FIG. 3. Thus, the VPL sampler 130 removes two of the three VPLs from the first object area 320. The VPL sampler 130 may determine VPLs to be removed using a probability function based on a predetermined factor, a random function, or a luminance of VPLs, for example, the VPLs 322, 324, and 326, applied from the previous frame 200 to the first object area 320.

As an example, based on the luminance of the VPLs 322, 324, and 326, the VPL sampler 130 may preferentially remove VPLs having relatively low luminance values. Based on the random function, the VPL sampler 130 may randomly determine the VPLs to be removed from the VPLs 322, 324, and 326. FIG. 4 illustrates a result obtained by removing the VPLs 324 and 326 from the VPLs 322, 324, and 326.

As an example, the VPL sampler 130 may remove the VPLs 324 and 326 included in an area having a relatively low luminance based on the luminance distribution of the first object area 320. As another example, the VPL sampler 130 may remove VPLs randomly selected from the VPLs 322, 324, and 326 of the first object area 320 using, for example, the random function.

While three VPLs are to be sampled in the third object area 310 of the current frame 300, only one VPL, i.e., the VPL 312 of the third object area 310, appear in the third object area 310 of the current frame 300 in the VPL sampling result applied from the previous frame 200 as illustrated in FIG. 3. Thus, the VPL sampler 130 additionally samples two new VPLs in the third object area 310. The VPL sampler 130 may sample the two new VPLs while maintaining the VPL 312 obtained by projecting the VPL 232 of the previous frame 200 onto the current frame 300.

As an example, the VPL sampler 130 additionally samples VPLs 412 and 414 in the third object area 310 based on the luminance distribution of the third object area 310. The VPL sampler 130 may additionally sample the VPLs 412 and 414 based on a luminance priority in the third object area 310 using an importance sampling scheme. In this example, the VPL sampler 130 may set a relatively low sampling probability for an area of the VPL 312 onto which the VPL 232 is projected in the current frame 300 so that a new VPL is not sampled in the area of the VPL 312. As another example, the VPL sampler 130 may randomly determine positions at which two new VPLs are to be sampled in the third object area, and sample the VPLs 412 and 414 at the determined positions. As another example, the object areas, for example, the third object area 310, the first object area 320, and the fourth object area 330, of the current frame 300 may be hierarchically configured, and the VPL sampler 130 may sample a new VPL at a center position of each subarea included in the third object area 310 in which the new VPL is to be sampled.

Since two VPL samplings are to be newly added to the fourth object area 330 in the current frame 300, the VPL sampler 130 samples two VPLs 432 and 434 in the fourth object area 330. The VPLs 432 and 434 may be sampled in the fourth object area 330 using a method similar to the method by which the VPLs 412 and 414 are additionally sampled in the third object area 330. For example, the VPL sampler 130 may sample the VPLs 432 and 434 at positions randomly determined based on the random function or positions determined based on the luminance distribution of the fourth object area 330.

Figure 5:
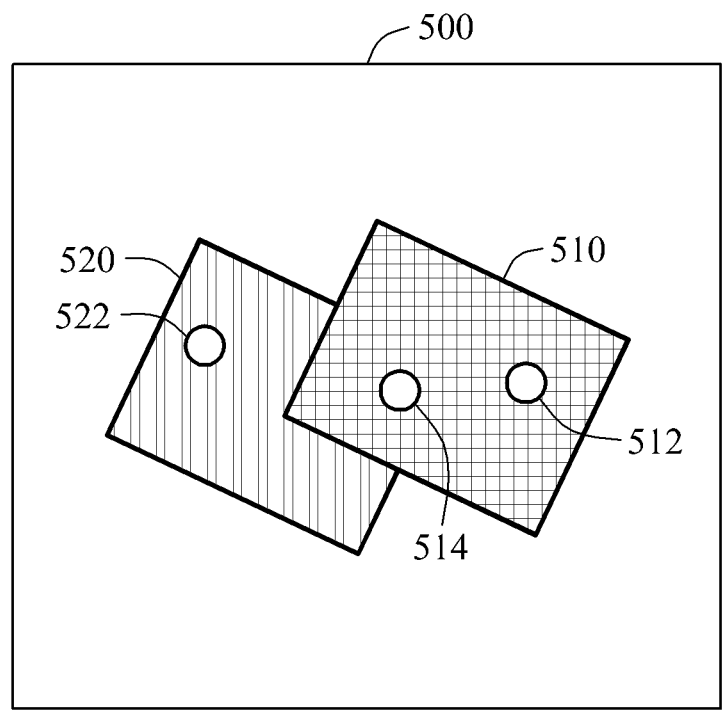
FIGS. 5 through 7 illustrate an example of sampling a VPL in a current frame using an importance map.
Figure 6:
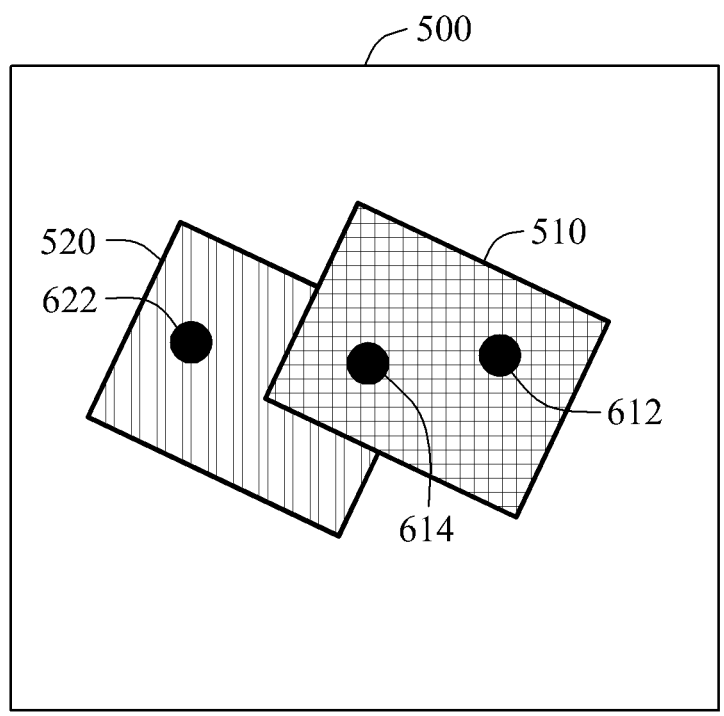
Figure 7:
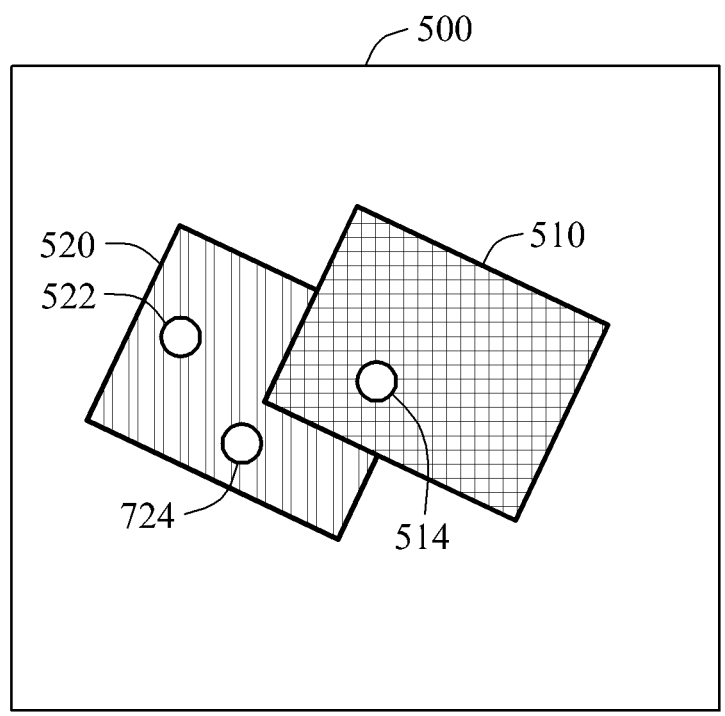

FIGS. 5 through 7 illustrate an example of sampling a VPL in a current frame using an importance map.

In a process of VPL sampling based on an importance sampling scheme, the VPL sampler 130 additionally samples a new VPL in a current frame using an importance map to which VPL information associated with a previous frame is applied. In a process of importance sampling, a probability distribution may be provided in a form of the importance map in which an importance is determined based on a luminance of a pixel. The importance map may include information on a sampling probability for each area of the current frame. In the probability distribution based on the importance map, an area having a relatively high probability may have a high sampling probability. The VPL sampler 130 may adjust a number of VPLs sampled in each area of the current frame by applying a VPL sampling result to the importance map of the current frame.

FIG. 5 illustrates an example of a current frame 500 onto which the VPL sampling result of a previous frame is projected. A first object area 510 and a second object area 520 are included in an image space represented by the current frame 500. VPLs 512 and 514 corresponding to two VPLs sampled in the previous frame are sampled in the first object area 510, and a VPL 522 corresponding to a VPL sampled in the previous frame is sampled in the second object area 520.

FIG. 6 illustrates an example of an operation of VPL sampling based on an importance map. In the importance map of the current frame 500, the VPL sampler 130 adjusts sampling probabilities of areas 612, 614, and 622 onto which VPLs of the previous frame are projected, and neighboring areas of the areas 612, 614, and 622.

In a process of sampling a VPL in the current frame, to increase or decrease a sampling probability at positions of VPLs of the previous frame projected onto the importance map of the current frame 500, the VPL sampler 130 adjusts an importance value of the positions. For example, the VPL sampler 130 may set the sampling probability of the areas 612, 614, and 622 to "0" so that a new VPL is not sampled in the areas 612, 614, and 622. Also, the VPL sampler 130 may adjust the sampling probability of the neighboring areas of the areas 612, 614, and 622 using a predetermined kernel. The predetermined kernel may be a Gaussian kernel, an Epanechnikov kernel, a uniform kernel, or any other kernel known to one of ordinary skill in the art. The VPL sampler 130 may perform the importance sampling scheme based on the importance map in which the sampling probability is adjusted. The VPL sampler 130 may determine an area to which the new VPL is to be added in lieu of an area onto which the VPLs of the previous frame are projected in the current frame 500.

When a probability value less than an original probability value is set as the probability value of the areas 612, 614, and 622 corresponding to positions of the VPLs of the previous frame, the sampling probability of the areas 612, 614, and 622 will be relatively low. In this example, other than the VPLs of the previous frame projected onto the current frame 500, a new VPL may be sampled in the current frame 500. The VPL sampler 130 may determine an entire VPL set for the current frame 500 by combining the VPLs of the previous frame projected onto the current frame 500 with an additionally sampled VPL.

FIG. 7 illustrates an example of a VPL sampling result of the current frame 500 adjusted based on the number of VPL samplings determined for each of the object areas in the current frame 500. As illustrated in FIG. 7, a new VPL 724 is additionally sampled in the second object area 520 in the current frame 500, and a VPL corresponding to the VPL 512 projected from the previous frame is removed from the first object area 510 of the current frame 500.

FIGS. 8 through 11 illustrate another example of sampling a VPL in a current frame.

Referring to FIGS. 8 through 11, the VPL density determiner 120 divides a pixel area of a current frame into a plurality of grid areas each having a regular or irregular form, and determines a number of VPL samplings for each of the grid areas. In the example in FIGS. 8 through 11, the grid areas have a regular form. The VPL density determiner 120 may determine an optimal number of VPL samplings for each of the grid areas based on a luminance distribution of each of the grid areas.

The VPL sampler 130 adjusts the number of VPLs sampled in the current frame to which VPLs of a previous frame are applied based on the number of VPL samplings determined for each of the grid areas. The VPL sampler 130 compares the number of VPL samplings determined for each of the grid areas with the number of VPLs projected from the previous frame onto the current frame. Based on a result of the comparing, the VPL sampler 130 adjusts the number of VPLs sampled in the grid areas of the current frame. For example, the VPL sampler 130 may maintain or remove a VPL projected from the previous frame onto the current frame. Also, the VPL sampler 130 may additionally sample a new VPL in the current frame. By sampling the VPL for each of the grid areas, the VPL sampler 130 may sample the VPL at an increased sampling rate.

The VPL sampling procedure described with reference to FIGS. 8 through 11 may be performed using a method similar to the method by which the VPL sampling procedure of FIGS. 2 through 4 is performed. When compared to the VPL sampling procedure of FIGS. 2 through 4, the VPL sampling procedure of FIGS. 8 through 11 differs in that the number of VPL samplings is determined based on a unit of a grid area in the current frame and the number of VPL samplings for each area is adjusted based on the unit of the grid area.

Figure 8:
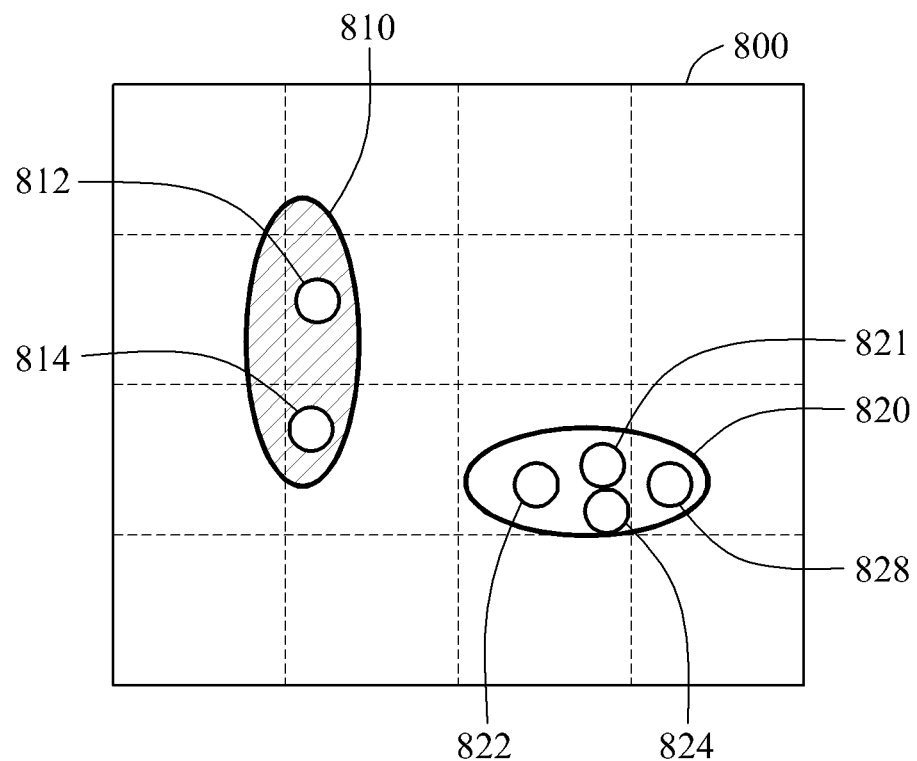
FIGS. 8 through 11 illustrate another example of sampling a VPL in a current frame.

FIG. 8 illustrates an example of a previous frame 800 including a first object area 810 and a second object area 820. In the previous frame 800, two VPLs 812 and 814 are sampled in the first object area 810, and four VPLs 821, 822, 824, and 828 are sampled in the second object area 820.

Figure 9:
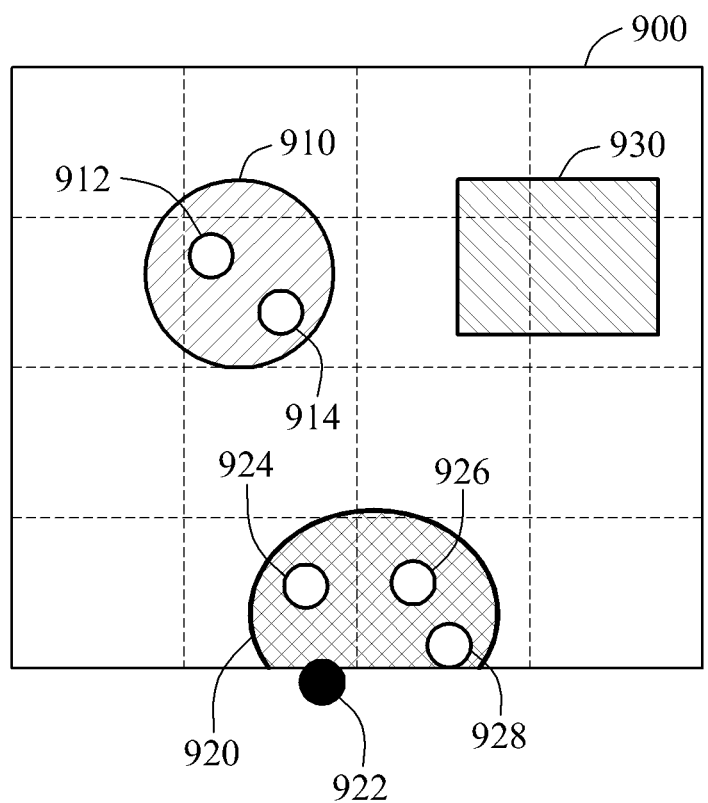

FIG. 9 illustrates an example of a current frame 900 to which a VPL sampling result of the previous frame 800 is applied. The current frame 900 includes a first object area 910 and a second object area 920 respectively corresponding to the first object area 810 and the second object area 820 of the previous frame 800. Also, a third object area 930 is additionally included in the current frame 900. Due to a viewpoint difference between the previous frame 800 and the current frame 900, the first object area 810 and the second object area 820 each have a different shape in the current frame 900 than in the previous frame 800.

Since the VPL sampling result is applied to the current frame 900, the VPLs 812 and 814 sampled in the first object area 810 of the previous frame 800 are projected onto the first object area 910 of the current frame 900 as VPLs 912 and 914. Also, the VPLs 821, 824, and 828 sampled in the second object area 820 of the previous frame 800 projected onto the second object area 920 of the current frame 900 as VPLs 924, 926, and 928. A VPL 922 projected from the VPL 822 in the previous frame 800 is not present in the current frame 900 due to the viewpoint difference between the previous frame 800 and the current frame 900.

Figure 10:
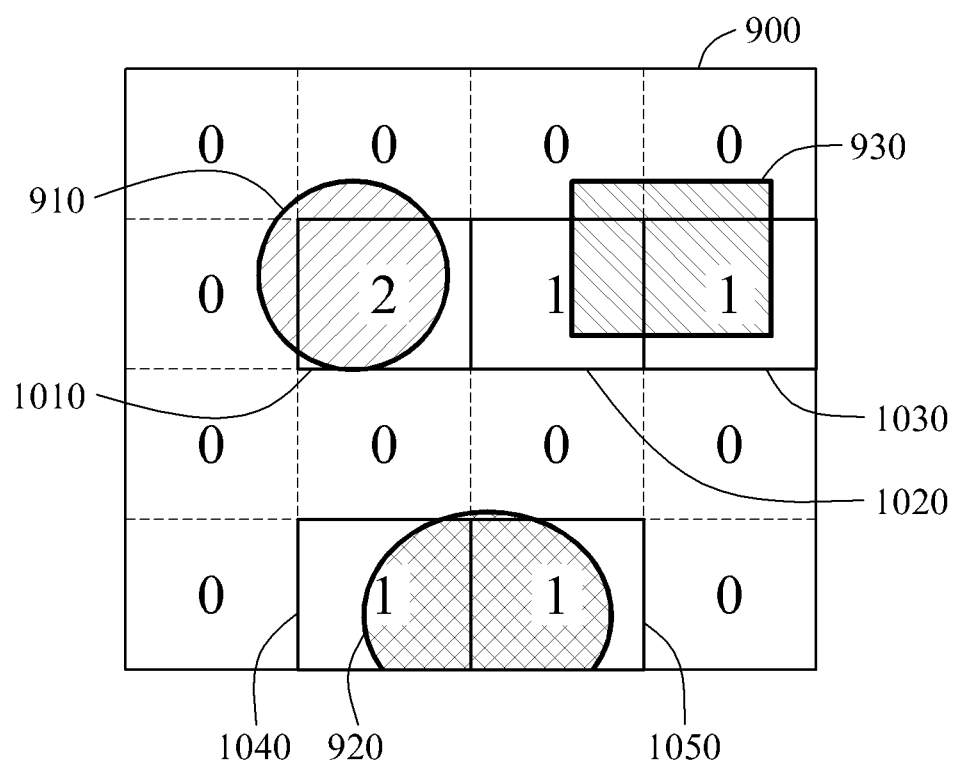

FIG. 10 illustrates an example of a number of VPL samplings determined for each grid area of the current frame 900. The VPL sampler 130 determines the number of VPL samplings for each grid area of the current frame 900. In FIGS. 8 through 10, the number of VPL samplings for a first grid area 1010 is determined to be "2", the number of VPL samplings for each of a second grid area 1020, a third grid area 1030, a fourth grid area 1040, and a fifth grid area 1050 is determined to be "1", and the number of VPL samplings for all other grid areas is determined to be "0".

Figure 11:
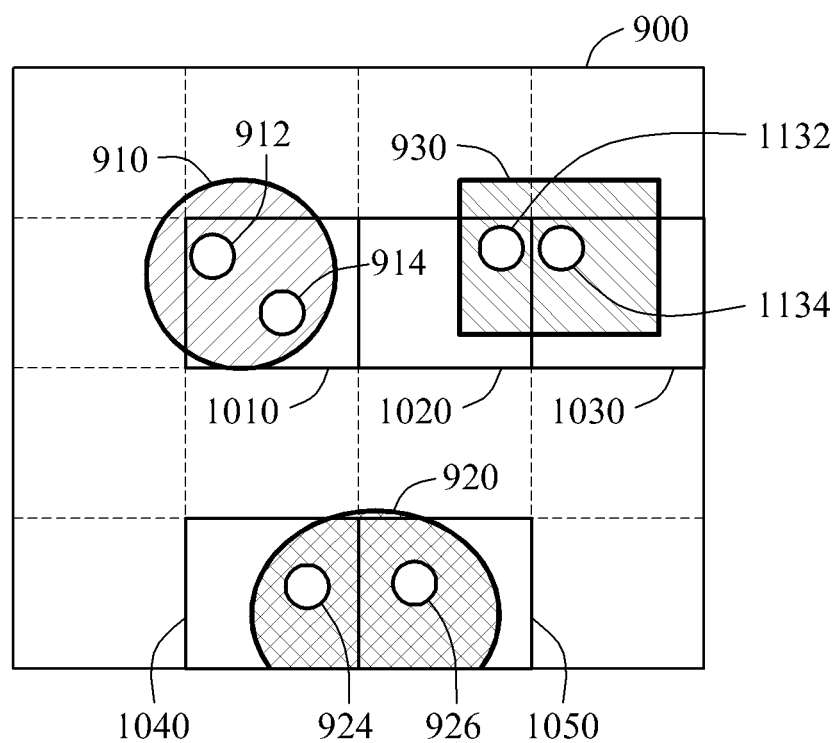

FIG. 11 illustrates an example of a result of sampling VPLs in the current frame 900 based on the number of VPL samplings determined for each grid area. The VPL sampler 130 adjusts the number of VPLs sampled based on a unit of a grid area in the current frame 900.

Since the number of VPL samplings for the first grid area 1010 is determined to be "2" and two VPLs, i.e., the VPLs 912 and 914, are projected from the previous frame 800 onto the first grid area 1010 in the current frame 900, the VPL sampler 130 maintains the two VPLs projected from the previous frame 800 onto the first grid area 1010 in the current frame 900.

Since the number of VPL samplings for the second grid area 1020 and the third grid area 1030 is determined to be "1" and none of VPLs from the previous frame 800 are projected onto the second grid area 1020 and the third grid area 1030 in the current frame 900, the VPL sampler 130 additionally samples one VPL in each of the second grid area 1020 and the third grid area 1030. The VPL sampler 130 may sample a new VPL in an area determined randomly or an area determined based on luminance distributions of the second grid area 1020 and the third grid area 1030. In FIG. 11, a VPL 1132 is sampled in the second grid area 1020, and a VPL 1134 is sampled in the third grid area 1030.

Since the number of VPL samplings for the fourth grid area 1040 is determined to be "1" and one VPL, i.e., the VPL 924, is projected from the previous frame 800 onto the fourth grid area 1040 of the current frame 900, the VPL sampler 130 maintains the VPL 924 projected from the previous frame 800 onto the fourth grid area 1040.

Since the number of VPL samplings for the fifth grid area 1050 is determined to be "1" and two VPLs, i.e., the VPLs 926 and 928, are projected from the previous frame 800 onto the fifth grid area 1050 of the current frame 900, the VPL sampler 130 removes one of the two VPLs 926 and 928. For example, the VPL sampler 130 may remove a VPL selected randomly or a VPL having a lower luminance between the two VPLs. FIG. 11 illustrates a result obtained by removing the VPL 928 and maintaining the VPL 926.

In the current frame 900, the number of VPL samplings for all other grid areas is determined to be "0", and all of the other grid areas, i.e., the grid areas excluding the first grid area 1010, the second grid area 1020, the third grid area 1030, the fourth grid area 1040, and the fifth grid area 1050, do not include a VPL after the VPL sampling result is applied from the previous frame. Thus, the VPL sampler 130 does not additionally sample a new VPL in the other grid areas.

Figure 12:
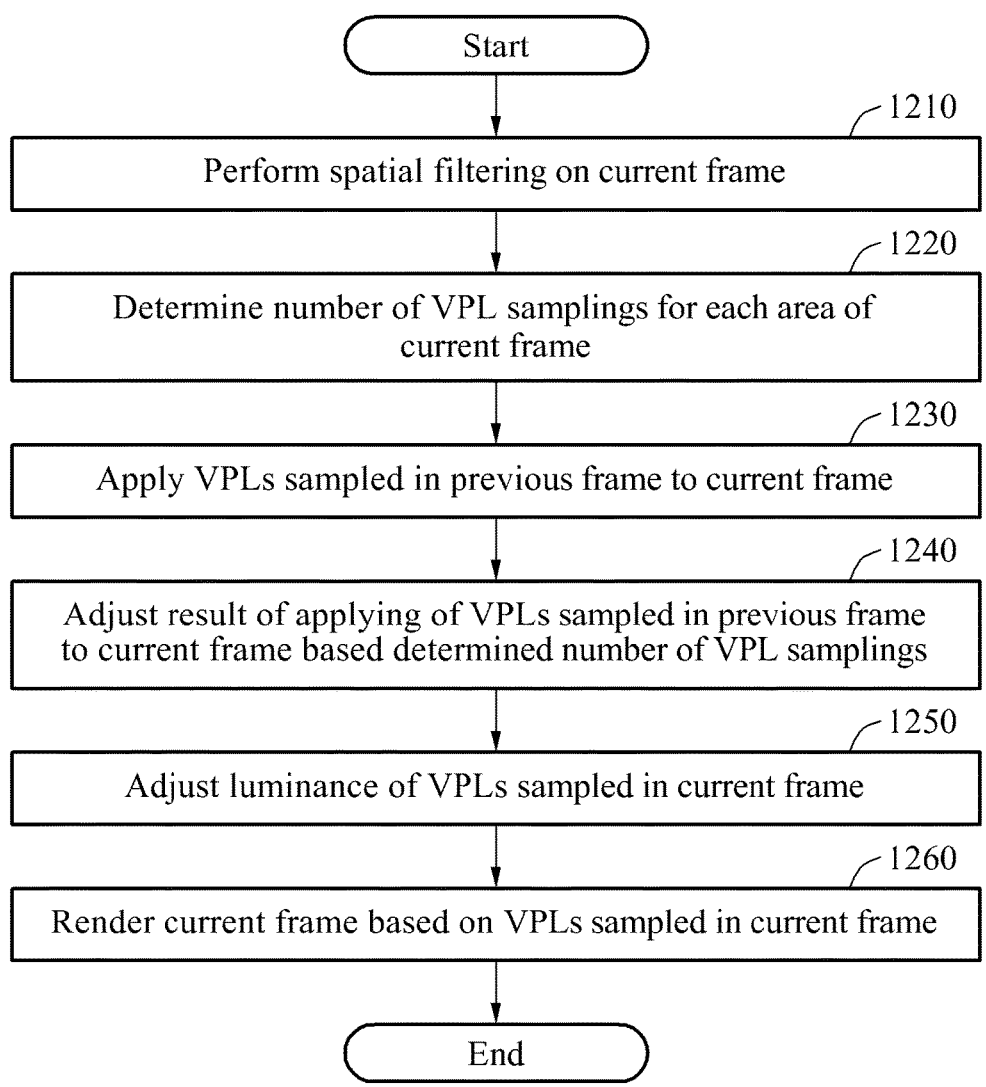
FIG. 12 illustrates an example of an image processing method.

FIG. 12 illustrates an example of an image processing method.

In operation 1210, an image processing apparatus selectively performs spatial filtering on a current frame. By applying, for example, a Gaussian kernel to the current frame, the image processing apparatus filters an object and an image space of the current frame to remove an area in which a radical change occurs. However, any other kernel capable of performing spatial filtering known to one of ordinary skill in the art may be used. The spatial filtering prevents a radical change in characteristics of sampled VPLs occurring based on a spatial change.

In operation 1220, the image processing apparatus determines a number of VPL samplings for each area of the current frame. The image processing apparatus divides the current frame into areas based on a unit of, for example, a grid area, an object area, or a bounding box, and determines the number of VPL samplings for each area into which the current frame is divided. For example, the image processing apparatus may divide the current frame into a plurality of grid areas each having a regular or irregular shape, and determine the number of VPL samplings for each of the grid areas using an importance sampling scheme.

In operation 1230, the image processing apparatus applies VPLs sampled in a previous frame to the current frame. The image processing apparatus samples VPLs at positions of the current frame corresponding to positions at which the VPLs are sampled in the previous frame. The image processing apparatus may project the VPLs sampled in an image space of the previous frame onto the current frame based on, for example, any one or any combination of any two or more of a view matrix, a projection matrix, and a model matrix for each object.

In operation 1240, the image processing apparatus adjusts a result of the applying of the VPLs sampled in the previous frame to the current frame based on the number of VPL samplings determined in operation 1220. For example, the image processing apparatus may adjust the number of VPLs sampled in each grid area of the current frame based on the number of VPL samplings determined for each grid area.

The image processing apparatus may remove or maintain the VPLs projected from the previous frame onto the current frame, or additionally sample a new VPL in the current frame, based on the number of VPL samplings determined for each area. The image processing apparatus compares the number of VPL samplings determined for each of a plurality of areas in the current frame with the number of VPLs projected from the previous frame onto the plurality of areas in the current frame. Based on a result of the comparing, the image processing apparatus adjusts the number of VPLs sampled in the plurality of areas in the current frame by additionally sampling one or more new VPLs in an area in the current frame in which the number of VPLs projected from the previous frame is less than the number of VPL samplings determined for the area, and removing one or more existing VPLs from the area if the number of VPLs projected from the previous frame is greater than the number VPL samplings determined for the area.

When a new VPL is additionally sampled in the current frame, the image processing apparatus may sample the new VPL in a priority determined based on a predetermined function or a luminance of an area to which the new VPL is to be added. Also, the image processing apparatus may sample the new VPL based on a movement or material characteristics of an object. For example, the image processing apparatus may additionally sample the new VPL in an area determined to have a relatively high probability that flickering will occur due to the movement or the material characteristics of the object therein.

When a VPL projected from the previous frame onto the current frame is removed, the image processing apparatus may remove the VPL in a priority determined based on, for example, a predetermined function, a viewpoint, or a luminance of the VPLs projected from the previous frame onto the current frame.

In operation 1250, the image processing apparatus selectively adjusts a luminance of VPLs sampled in the current frame to prevent a radical change in the luminance of the VPLs between the previous frame and the current frame. For example, the image processing apparatus may adjust the luminance of the VPLs sampled in the current frame so that a luminance difference between the VPLs sampled in the previous frame and the VPLs sampled in the current frame falls within a preset range.

In operation 1260, the image processing apparatus renders the current frame based on the VPLs sampled in the current frame. For example, the image processing apparatus may arrange the VPLs sampled in the current frame in a light view rendering image of the current frame, and apply an indirect light effect to the rendering image based on the arranged VPLs.

The spatial filter 110, the VPL density determiner 120, the VPL sampler 130, the temporal filter 140, and the renderer 150 in FIG. 1 that perform the various operations described with respect to FIGS. 1-12 may be implemented using hardware components. The hardware components may include processing devices. A processing device may be implemented using one or more hardware devices configured to carry out and/or execute program code by performing arithmetical, logical, and input/output operations. The processing device may be a processor, a controller and an arithmetic logic unit, a digital signal processor, a microcomputer, a field-programmable array, a programmable logic unit, a microprocessor, a computer or any other device known to one of ordinary skill in the art that is capable of responding to and executing instructions in a defined manner. The processing device may run software that may include an operating system (OS) and one or more software applications that run on the OS. The processing device may access, store, manipulate, process, and create data in response to execution of the software. For simplicity, a processing device has been referred to in the singular in the above description, but one of ordinary skill in the art will appreciate that a processing device may include multiple processing elements and multiple types of processing elements. For example, a processing device may include multiple processors or a processor and a controller. In addition, different processing configurations are possible, such as parallel processors.

The software may include a computer program, code segments, instructions, or some combination thereof, to independently or collectively instruct and/or configure the processing device to perform the functions of the various elements in FIG. 1, thereby transforming the processing device into a special-purpose computer. Software and data may be embodied permanently or temporarily in any type of machine, component, physical or virtual equipment, computer storage medium, or device. The software also may be distributed over network-coupled computer systems so that the software is stored and executed in a distributed fashion. The software and data may be stored on one or more non-transitory computer-readable storage media.

The method in FIG. 12 that performs the various operations described with respect to FIGS. 1-12 implemented by program instructions for controlling a processing device as described above to perform the method. The program instructions may be stored in one or more non-transitory computer-readable media. The one or more non-transitory computer-readable storage media may also store data files, data structures, and any other information needed to perform the method. The program instructions may include program instructions specially designed and constructed to implement the method, and computer instructions that are well known to one of ordinary skill in the art. Examples of a non-transitory computer-readable storage medium include magnetic media such as hard disks, floppy disks, and magnetic tape; optical media such as CD-ROM discs, DVDs, and Blu-ray discs; magneto-optical media such as optical discs; read-only memory (ROM); random-access memory (RAM); flash memory such as USB flash drives, memory cards, and memory sticks; and any other type of non-transitory computer-readable storage medium known to one of ordinary skill in the art. Examples of program instructions include both machine code, such as is produced by a compiler, and files containing higher-level code that may be executed by a computer using an interpreter. The program instructions may be written to operate as one or more software modules to perform the operations of the method of FIG. 12.

While this disclosure includes specific examples, it will be apparent to one of ordinary skill in the art that various changes in form and detail may be made in these examples without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image processing method comprising:
   determining, by a processor, a number of virtual point light (VPL) samplings for each area of a current frame;
   applying, by the processor, VPLs sampled in a previous frame to the current frame;
   adjusting, by the processor and dependent on material characteristics of a plurality of objects included in the current frame, a result of the applying based on the determined number of VPL samplings, wherein the adjusting comprises adjusting a luminance of the VPLs sampled in the current frame using a temporal filter based on a luminance of the VPLs sampled in the previous frame; and
   rendering, by the processor, the current frame based on the adjusted result of the applying.

2. The method of claim 1, wherein the adjusting comprises adjusting a number of VPLs sampled in each area of the current frame to which the VPLs of the previous frame are applied based on the determined number of VPL samplings for each area of the current frame.

3. The method of claim 1, wherein the adjusting comprises sampling at least one new VPL in addition to the VPLs applied to the current frame to satisfy the determined number of VPL samplings.

4. An image processing method comprising:
   determining, by a processor, a number of virtual point light (VPL) samplings for each area of a current frame;
   applying, by the processor, VPLs sampled in a previous frame to the current frame;
   adjusting, by the processor, a result of the applying based on the determined number of VPL samplings by sampling at least one new VPL in addition to the VPLs applied to the current frame to satisfy the determined number of VPL samplings; and
   rendering, by the processor, the current frame based on the adjusted result of the applying, wherein the sampling comprises determining a position at which the new VPL is to be sampled based on a luminance distribution of an area in which the new VPL is to be sampled.

5. The method of claim 3, wherein the sampling comprises randomly determining a position at which the new VPL is to be sampled in an area in which the new VPL is to be sampled.

6. The method of claim 3, wherein the sampling comprises determining a position at which the new VPL is to be sampled based on both of a movement of an object included in the current frame and the material characteristics of the object, wherein the object is included in the plurality of objects.

7. The method of claim 3, wherein the sampling comprises sampling the new VPL at a center position of each subarea in an area in which the new VPL is to be sampled.

8. The method of claim 1, wherein the adjusting comprises removing at least one VPL from the VPLs applied to the current frame to satisfy the determined number of VPL samplings.

9. The method of claim 8, wherein the removing comprises determining a VPL to be removed from the VPLs applied to the current frame based on a luminance of the VPLs applied to the current frame.

10. The method of claim 1, wherein the determining comprises:
    setting a plurality of object areas in the current frame; and
    determining the number of VPL samplings for each of the set object areas.

11. The method of claim 1, wherein the determining comprises:
    setting a plurality of grid areas in the current frame; and
    determining the number of VPL samplings for each of the set grid areas.

12. The method of claim 1, wherein the applying comprises sampling a VPL at a position in the current frame corresponding to a position at which each of the VPLs is sampled in the previous frame.

13. The method of claim 1, wherein the applying comprises applying the VPLs sampled in the previous frame to the current frame using any one or any combination of any two or more of a view matrix, a projection matrix, and a model matrix.

14. The method of claim 1, further comprising performing, by the processor, spatial filtering on the current frame;
    wherein the determining comprises determining the number of VPL samplings for each area of the current frame on which the spatial filtering is performed.

15. The method of claim 1, wherein the determining comprises determining the number of VPL samplings for each of a plurality of grid areas of the current frame; and
the adjusting comprises adjusting a number of VPLs sampled in each grid area of the current frame based on the determined number of VPL samplings for each grid area of the current frame.

16. The method of claim 15, wherein the determining comprises determining the number of VPL samplings for each grid area based on luminance information on each grid area.

17. The method of claim 15, wherein the adjusting comprises adjusting a number of VPLs to be sampled in each grid area of the current frame to which the VPLs of the previous frame are applied based on the determined number of VPL samplings for each grid area of the current frame.

18. A non-transitory computer-readable medium storing instructions that, when executed by a processor, cause the processor to perform the method of claim 1.

19. An image processing apparatus comprising:
a processor configured to:
determine a number of VPL samplings for each area of a current frame;
apply VPLs sampled in a previous frame to the current frame;
adjust, dependent on material characteristics of a plurality of objects included in the current frame, a result of the applying based on the determined number of VPL samplings for each area of the current frame; and
render the current frame based on the adjusted result of the applying; and
a temporal filter configured to adjust a luminance of the VPLs sampled in the current frame based on a luminance of the VPLs sampled in the previous frame.

20. An image processing apparatus comprising:
a processor configured to:
determine a number of VPL samplings for each area of a current frame;
apply VPLs sampled in a previous frame to the current frame;
adjust a result of the applying based on the determined number of VPL samplings for each area of the current frame; and
render the current frame based on the adjusted result of the applying, and
a temporal filter configured to adjust a luminance of the VPLs sampled in the current frame based on a luminance of the VPLs sampled in the previous frame.

21. The apparatus of claim 19, further comprising a spatial filter configured to apply a spatial filter to the current frame;
wherein the processor is further configured to determine a number of VPLs sampled in each area of the current frame to which the spatial filter is applied.

22. The apparatus of claim 19, wherein the processor is further configured to adjust a number of VPLs sampled in each area of the current frame to which the VPLs of the previous frame are applied based on the determined number of VPL samplings for each area of the current frame.

23. The apparatus of claim 19, wherein the processor is further configured to set a plurality of grid areas in the current frame, and determine the number of VPL samplings for each of the set grid areas.

24. The apparatus of claim 23, wherein the processor is further configured to determine the number of VPL samplings for each grid area based on luminance information on each grid area.

25. An image processing apparatus comprising:
a processor configured to:
determine a number of VPL samplings for each grid area of a current frame;
sample, dependent on material characteristics of a plurality of objects included in the current frame, a VPL in each grid area based on the determined number of VPL samplings; and
render the current frame based on the VPL sampled in each grid area of the current frame; and
a temporal filter configured to adjust a luminance of the VPLs sampled in the current frame based on a luminance of the VPLs sampled in the previous frame.

26. An image processing method comprising:
determining, by a processor, a number of virtual light points (VPLs) for each area of a current frame;
sampling, by the processor and dependent on material characteristics of a plurality of objects included in the current frame, VPLs in the current frame based on VPLs sampled in a previous frame and the determined number of VPLs for each area; and
rendering, by the processor, the current frame based on the VPLs sampled in the current frame,
wherein the sampling comprises determining a position at which the new VPL is to be sampled based on a luminance distribution of an area in which the new VPL is to be sampled.

27. The method of claim 26, wherein the determining comprises determining the number of VPLs for each area of the current frame based on information on the current frame.

28. The method of claim 26, wherein the sampling comprises:
applying the VPLs sampled in the previous frame to the current frame; and
keeping as many of the VPLs applied from the previous frame as possible in the current frame without exceeding the number of VPLs determined for each area of the current frame.

29. The method of claim 28, wherein the sampling further comprises sampling new VPLs in the current frame based on a number of the VPLs applied from the previous frame kept in the current frame so that each area of the current frame includes only the number of VPLs determined for the area.

30. The method of claim 26, wherein the sampling comprises:
applying the VPLs sampled in the previous frame to the current frame;
in any area of the current frame in which a number of the VPLs applied from the previous frame exceeds the number of VPLs determined for the area, removing from the area enough of the VPLs applied from the previous frame to cause the area to include only the number of VPLs determined for the area; and
in any area of the current frame in which a number of the VPLs applied from the previous frame is less than the number of VPLs determined for the area, sampling enough new VPLs in the area to cause the area to include only the number of VPLs determined for the area.

31. The method of claim 26, wherein the sampling is performed in a way that reduces flickering between the previous frame and the current frame in the rendered current frame.

32. The method of claim 3, wherein the sampling comprises determining a position at which the new VPL is to be sampled based on a luminance distribution of an area in which the new VPL is to be sampled.

* * * * *